United States Patent Office 3,525,537
Patented Aug. 25, 1970

3,525,537
IMPLEMENT FRAME
Darrel Lee Honnold, Winterset, Iowa, assignor to Deere & Company, Moline, Ill., a corporation of Delaware
Filed Nov. 26, 1968, Ser. No. 779,084
Int. Cl. B62d 53/00
U.S. Cl. 280—411       5 Claims

ABSTRACT OF THE DISCLOSURE

An elongated tool bar for carrying earth-working implements is adapted to be integrally connected to a tractor three-point hitch during field use, but is adapted to be pulled endwise for highway transport. The transport wheels for the tool bar are alternately mountable in working and transport positions. A pair of the transport wheels are mounted on the end portions of the tool bar and, when in the working position, extend below the tool bar a short distance to stabilize the tool bar and prevent earth-working implements mounted near the ends of the tool bar from penetrating the earth an excessive amount.

BACKGROUND OF THE INVENTION

The present invention relates generally to implement frames adapted to carry a plurality of earth-working tools, and more particularly relates to an endwise transport system for wide integrally mounted implement frames.

Past experience has proven that there are basically three factors which limit the size of agricultrual implements which are integrally mounted to a tractor three-point hitch. The first of these factors is the available tractor horsepower, the second factor is the weight of the implement, and the third factor is the width of the implement. The present invention is concerned with the third factor.

Wide integrally mounted implements present two problems. The first of these problems is that they exceed the legal width for highway transport and cannot pass through gates when moving from field to field. The second problem presented by wide integrally mounted implements is that of stability. Until the present invention, an increase in the width of an integrally mounted implement was accompanied by a corresponding decrease in its stability. For example, as a tractor traverses rough terrain, it often moves out of the horizontal plane and tilts to one side or the other. The tilting movement of the tractor is magnified through the frame of a wide integrally mounted implement so that the earth-working tools mounted on the end of the frame corresponding to the tractor high side are raised and the earth-working tools mounted on the opposite end of the frame are lowered. If the implement is wide enough, it is possible for the tools on one end of the frame to completely leave the ground while the tools on the opposite end of the frame are caused to operate at excessive depths.

SUMARY OF THE INVENTION

According to the present invention, an implement frame which is adapted to be integrally connected to a tractor three-point hitch for field use is provided with transport wheels which permit the implement frame to be pulled endwise for transport and also serve to stabilize the frame when in field use. Therefore, the primary object of the invention is to provide a transportable wide integrally mounted implement frame in which the transport wheels are alternately mountable in working and transport positions and in which the transport wheels, when in their working position, extend below the frame a short distance to limit earth penetration of the tools mounted on the frame.

A further object of the invention is to provide an endwise transport system for wide integrally mounted implement frames in which a pair of transport wheels are mounted on the end portions of the frame in alternate transport and working positions in which they extend generally downwardly from the frame and generally forwardly and downwardly from the frame respectively.

Another object of the invention is to provide a transport system for wide integrally mounted implement frames which is of simple construction, in which the wheels of the transport system are easily moved between their working and transport positions, and in which the wheels of the transport system serve the dual function of stabilizing the implement frame during field use.

The above objects and additional objects and advantages of the present invention will become apparent along with the details of construction of a preferred embodiment of the invention from a reading of the following detailed description when taken in conjunction with the accompanying drawing.

DESCRIPTION OF THE PREFERRED EMBODIMENT

Figure 1:
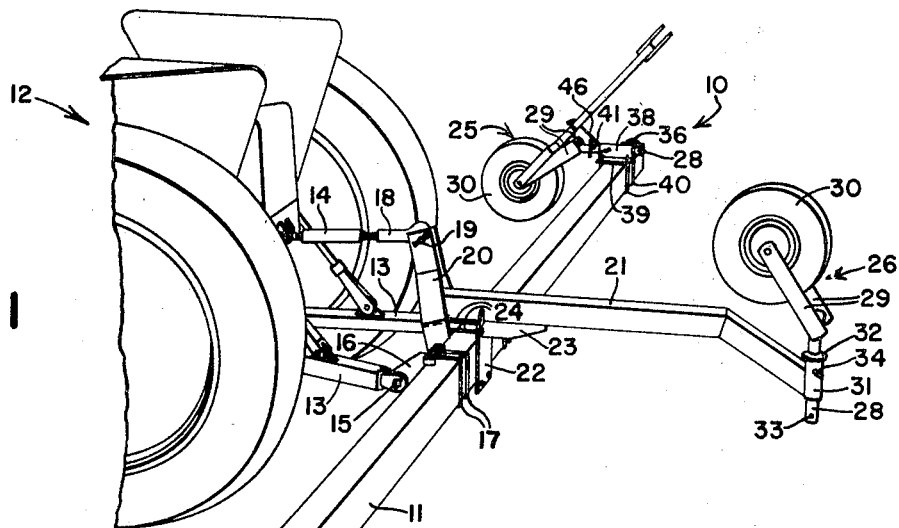
FIG. 1 is a perspective view of an implement frame constructed in accordance with the principles of the present invention, the implement being attached to a tractor three-point hitch for field use.

Referring to the drawing, the implement frame is indicated in its entirety by the numeral 10 and includes an elongated tool bar 11 which is adapted to carry a plurality of depending earth-working tools such as rotary hoe units as illustrated in copending application Ser. No. 778,982 filed Nov. 26, 1968, chisel plows or cultivator shovels. Since the earth-working tools do not form a part of the present invention, they are not illustrated in the drawing for the purpose of simplicity. As illustrated in FIG. 1, the tool bar 11 is adapted to be integrally mounted on a tractor indicated generally at 12. The tractor 12 is provided with a conventional power operated three-point hitch which includes a pair of lower draft links 13 and an upper center link 14. The trailing ends of the draft links 13 are apertured to receive hitch pins 15 carried by brackets 16 which are secured to the forward side of the tool bar 11 substantially medially the length thereof in spaced relation to one another by U-bolts 17. The trailing end of the upper link 14 is provided with a hook member 18 which engages a hitch pin 19 carried by an upstanding mast 20 which is fixed to the forward side of the tool bar 11 in any suitable manner. When the tool bar 11 is integrally connected to the tractor as illustrated in FIG. 1, the tool bar 11 can be raised and lowered in the conventional manner by raising and lowering the tractor three-point hitch.

The implement frame 10 also includes a beam 21 which has one end secured to the tool bar 11 and extends rearwardly therefrom. The connection between the beam 21 and tool bar 11 is accomplished by brackets 22 and 23 and U-bolts 24. The bracket 22 has its upper end secured to the beam 21 in any suitable manner such as welding and extends downwardly therefrom. The bracket 23 is welded between the beam 21 and bracket 22 to provide reinforcement for the bracket 22. The bracket 22 is clamped to the tool bar 11 by the U-bolts 24.

With the tool bar 11 extending transversely behind the tractor 12 as illustrated in FIG. 1, it exceeds the legal width for highway transport and is also too wide to pass through gates when moving from field to field. The frame 10 is therefore provided with a transport system which permits it to be towed endwise. The transport system consists essentially of three wheel units mounted on the ends of the tool bar 11 and the free end of the beam 21. The wheel units are indicated generally at 25, 26 and 27. Each of the wheel units includes a mounting shaft 28, a pair of substantially parallel arms 29 extending away from one end of the shaft 28 at an obtuse angle, and a wheel 30 journaled between the free ends of the arms 29.

Figure 3:
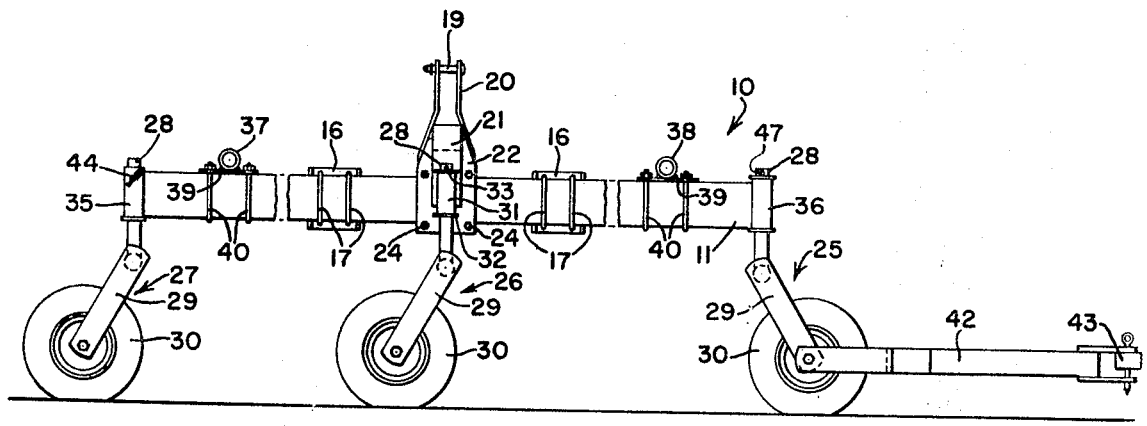
FIG. 3 is a rear elevational view of the implement frame prepared for transport.

The shaft 28 of the wheel unit 26 is adapted to be inserted through a vertically extending mounting sleeve 31 fixed on the rear end of the beam 21 in any suitable manner such as welding. When the implement frame 10 is connected to the tractor three-point hitch, the shaft 28 of wheel unit 26 is inserted into the sleeve 31 from the top thereof as illustrated in FIG. 1, and when the implement frame 10 is to be towed endwise, it is inserted into the sleeve 31 from the bottom thereof as illustrated in FIG. 3. A washer 32 is fixed on the shaft 28 of wheel unit 26 to limit the movement of the shaft 28 into the sleeve 31. When the wheel unit 26 is in its transport position as illustrated in FIG. 3, its shaft 28 is retained within the sleeve 31 in a rotatable manner by a removal pin which extends through a suitable opening 33 provided in the extreme end of the shaft 28. When the wheel unit 26 is in its working position as illustrated in FIG. 1, it is nonrotatably locked within the sleeve 31 by removable pin 34 which extends through suitable openings provided in both the sleeve 31 and shaft 28.

The mounting shafts 28 of the wheel units 25 and 27 are alternately mountable in vertically extending mounting sleeves 35 and 36 fixed to the ends of the tool bar 11 and horizontal fore-and-aft extending mounting sleeves 37 and 38 fixed to the top of the tool bar 11 adjacent the ends thereof. The sleeves 37 and 38 are welded to brackets 39 which are clamped to the tool bar 11 by U-bolts 40. By using the brackets 39 and U-bolts 40 to mount the sleeves 37 and 38, they can be moved along the length of the tool bar 11 and fixed in a position where they will not interfere with the mounting of earth-working tools on the tool bar. The vertically extending sleeves 35 and 36 are welded or otherwise suitably secured directly to the ends of the tool bar 11. Washers 41 are fixed to the shafts 28 of the wheel units 25 and 27 to limit the movement of the shafts 28 within the sleeves 35–38. The wheel unit 25 is also provided with a draft member 42 which has one end pivotally connected to the arms 29 and is adapted to have its other end secured to a tractor drawbar 43.

Figure 2:
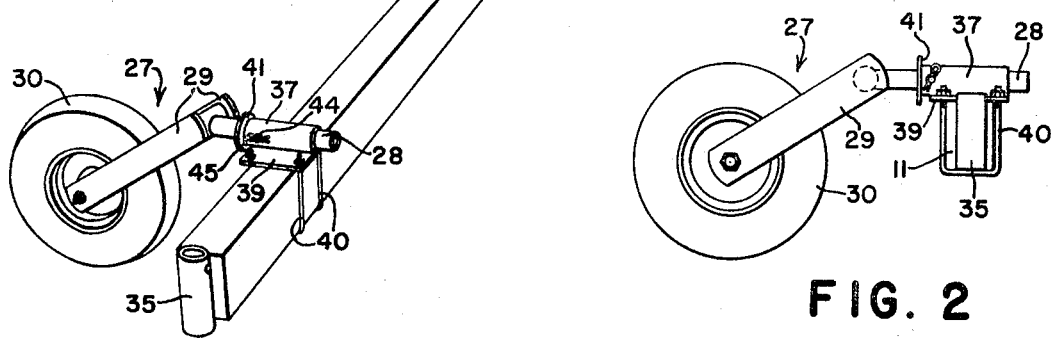
FIG. 2 is an end elevational view of the implement frame shown in FIG. 1.

For reasons which will be explained hereinafter, when the wheel units 25 and 27 are mounted in their working position as illustrated in FIG. 1, they are nonrotatably locked within the sleeves 38 and 37 with their arms 29 projecting generally forwardly and downwardly so that the wheels 30 extend below the tool bar 11 as best illustrated in FIG. 2. The wheel unit 27 is locked within the sleeve 37 by a pin 44 which extends through suitable openings provided within the shaft 28 and sleeve 37 and which is retained within the openings by a key 45. The wheel unit 25 is locked within sleeve 38 by a U-shaped key 46 which has one leg extending through suitable openings provided within the shafts 28 and sleeve 38 and has its other leg engaging the draft member 42 to hold the draft member 42 folded back along the legs 29. When the wheel unit 27 is in its transport position as illustrated in FIG. 3, it is nonrotatably locked within the sleeve 35 by inserting the pin 44 through a suitable opening provided within the sleeve 35 and the opening provided within the shaft 28. When the wheel unit 25 is in its transport position as illustrated in FIG. 3, it is free to rotate within the sleeve 36, but is locked within the sleeve 36 by inserting a pin through an opening 47 provided in the end of the shaft 28.

When it is desired to transport the implement frame 10, the wheel units 25, 26 and 27 can be mounted in their transport positions by performing the following steps. The frame 10 is first raised by operation of the power operated three-point hitch. With the frame 10 raised, the wheel unit 26 can be removed from the sleeve 31, and its shaft 28 can be inserted through the bottom of sleeve 31 and rotatably locked therein by inserting a pin through the opening 33. The wheel units 25 and 27 are then removed from the sleeves 38 and 37 and mounted within the sleeves 36 and 35. The wheel unit 25 is rotatably locked within the sleeve 36 by inserting a pin through the opening 28, and the wheel unit 27 is nonrotatably locked within the sleeve 35 by the pin 44. The frame 10 is then lowered and disconnected from the three-point hitch so that the tractor can be moved to the end of the frame and connected to the draft member 42. The wheel units are returned to their working positions by reversing the above steps.

When the wheel units 25 and 27 are in their working position as illustrated in FIGS. 1 and 2, they serve to stabilize the tool bar 11. Specifically, if the tool bar 11 begins to rock about the draft links 13 as the tractor 12 travels over rough terrain, the wheels 30 of the wheel units 25 and 27 will limit the rocking movement of the tool bar 11 by engagement with the ground. Also, if the tractor 12 tilts to one side or another due to one of its rear wheels traveling over a knoll or through a depression in the ground, the tool bar 11 will have a tendency to tilt to the same degree as the tractor. However, due to the length of the tool bar 11, this tilting movement may lift one side of the tool bar 11 a sufficient distance to remove any earth-working tools mounted thereon from the ground while the opposite end of the tool bar is lowered and the earth-working tools mounted thereon may operate at an excessive depth. Since the wheels 30 of the wheel units 25 and 27 extend below the tool bar 30, the wheel unit on the lower end of the frame will engage the ground and prevent the tool bar 11 from tilting to an excessive degree.

It should also be noted that by extending the wheel units 25 and 27 forwardly of the tool bar 11 when they are in their working position, they are not only prevented from interfering with any earth-working tools mounted on the tool bar, but are also positioned in closer alignment with the rear wheels of the tractor. This feature is of importance if the tractor travels over a drainage ditch or the like since as the rear wheels of the tractor move into the ditch the wheel units 25 and 27 will also move into the ditch and the tool bar will not bridge on the wheel units 25 and 27.

From the foregoing, it can be seen that the present invention provides an extremely simple transport system for wide integrally mounted implement frames in which the wheels of the transport system serve the additional function of stabilizing the implement frame.

What is claimed is:

1. An implement carrier comprising: a transversely extending elongated tool bar; hitch means on the tool bar for connection with a tractor three-point hitch; a longitudinally extending frame beam having its forward end fixed to the tool bar and extending rearwardly therefrom; a first wheel unit mountable on the rear portion of the frame beam in optional alternate working and transport positions in which it extends respectively above and below the frame bar; second and third wheel units mountable on the end portions of the tool bar in optional alternate working and transport positions in which they extend respectively generally forwardly and downwardly from the frame member and generally downwardly and transversely outwardly from the frame member; and draft means on one of the second and third wheel units connectible with the tractor when the wheel units are in their transport positions.

2. An implement carrier as set forth in claim 1 wherein each of the wheel units includes a mounting shaft portion and a wheel carrying portion extending at an obtuse angle with respect to the shaft portion; a vertically extending mounting sleeve is carried on the rear portion of the frame bar; the mounting shaft of the first wheel unit is optically alternately insertable into the sleeve from the top and bottom thereof to mount the first wheel unit in its optional alternate working and transport positions respectively; a pair of vertically extending mounting sleeves and a pair of longitudinally extending mounting sleeves are carried on the end portions of the tool bar; and the mounting shafts of the second and third wheel units are optionally alternately insertable into the pair of vertically extending sleeves and the pair of longitudinally extending sleeves to mount the second and third wheel units in their optional alternate transport and working positions respectively.

3. The implement carrier set forth in claim 2 further including means releasably locking the second and third wheel units in the pair of longitudinally extending sleeves when the second and third wheel units are in the working position to prevent any rotary movement of the shafts within the last mentioned sleeves.

4. An implement carrier adapted to be attached to a tractor provided with a three-point hitch, the carrier comprising: a transversely extending frame having a front, rear and sides and adapted to carry a plurality of depending earth-working tools; a first wheel unit mountable on the rear of the frame in alternate working and transport positions in which the wheel extends above and below the frame, respectively; and second and third wheel units mountable on the frame adjacnet the front and sides thereof in alternate working and transport positions in which they extend generally forwardly of and downwardly from the frame and generally downwardly from and transversely outwardly of the frame, respectively.

5. A transport and stabilizing system for a transversely extending implement frame adapted to be carried by a tractor three-point hitch, the frame having a front, rear and sides and being adapted to carry a plurality of depending earth-working tools, the system comprising: a pair of vertically extending mounting sleeves fixed to the sides of the frame; a pair of horizontal fore-and-aft extending mounting sleeves fixed to the frame adjacent the front and sides thereof; a vertically extending mounting sleeve fixed to the rear of the frame; a plurality of wheel units; each of the wheel units including a mounting shaft portion and a wheel carrying portion extending at an obtuse angle with respect to the shaft portion; the shaft of one of the wheel units being insertable into the sleeve fixed to the rear of the frame alternately from the top and bottom thereof; the shafts of a pair of the wheel units being alternately insertable into the vertically and horizontally extending sleeves, and means for releasably locking the wheel units within the horizontal sleeves with the wheel carrying portions thereof extending generally forwardly and downwardly.

References Cited

UNITED STATES PATENTS

| 2,976,058 | 3/1961 | Sandgren | 280—413 |
| 3,240,005 | 3/1966 | Rowse | 172—625 X |
| 3,288,480 | 11/1966 | Calkins | 280—43.23 |
| 3,437,353 | 4/1969 | Lange | 280—415 |

FOREIGN PATENTS

| 691,526 | 5/1953 | Great Britain. |
| 833,499 | 4/1960 | Great Britain. |

LEO FRIAGLIA, Primary Examiner

U.S. Cl. X.R.

172—625; 280—415

UNITED STATES PATENT OFFICE
CERTIFICATE OF CORRECTION

Patent No. 3,525,537    Dated 25 August 1970

Inventor(s) Darrel Lee Honnold

It is certified that error appears in the above-identified patent and that said Letters Patent are hereby corrected as shown below:

Column 5, line 7, change "optically" to -- optionally --; line 33, change "adjacnet" to -- adjacent --.

SIGNED AND
SEALED
DEC 22 1970

(SEAL)
Attest:

Edward M. Fletcher, Jr.
Attesting Officer

WILLIAM E. SCHUYLER, JR.
Commissioner of Patents